United States Patent

Arnold et al.

[11] Patent Number: 6,144,540
[45] Date of Patent: Nov. 7, 2000

[54] CURRENT SUPPRESSING CIRCUIT BREAKER UNIT FOR INDUCTIVE MOTOR PROTECTION

[75] Inventors: David Arnold, Chester, Conn.; Anil R. Duggal, Niskayuna; Lionel M. Levinson, Schenectady, both of N.Y.

[73] Assignee: General Electric Company, Schenectady, N.Y.

[21] Appl. No.: 09/265,276

[22] Filed: Mar. 9, 1999

[51] Int. Cl.[7] .................................................. H02H 3/00
[52] U.S. Cl. ........................ 361/93.9; 361/93.1; 361/93.8; 361/106; 338/22 R
[58] Field of Search .................................. 361/93.1, 93.2, 361/93.3, 93.8, 93.9, 94–96, 103, 106, 102, 126; 338/22 R, 20, 225 D, 21

[56] References Cited

U.S. PATENT DOCUMENTS

| | | | |
|---|---|---|---|
| 2,933,574 | 4/1960 | Frink | 200/144 |
| 2,978,665 | 4/1961 | Vernet et al. | 338/223 |
| 3,046,371 | 7/1962 | Jencks | 200/88 |
| 3,226,600 | 12/1965 | Zielasek | 315/209 |
| 3,243,753 | 3/1966 | Kohler | 338/31 |
| 3,488,761 | 1/1970 | Ito et al. | 337/221 |
| 3,548,358 | 12/1970 | Klein | 337/83 |
| 3,632,926 | 1/1972 | Heft | 200/144 C |
| 3,648,002 | 3/1972 | Du Rocher | 200/166 C |
| 3,673,121 | 6/1972 | Meyer | 252/511 |
| 3,914,727 | 10/1975 | Fabricius | 338/22 R |
| 3,978,300 | 8/1976 | Slade | 200/147 R |
| 4,001,742 | 1/1977 | Jencks et al. | 335/173 |
| 4,017,715 | 4/1977 | Whitney et al. | 219/553 |
| 4,019,097 | 4/1977 | Miller et al. | 361/93 |
| 4,077,025 | 2/1978 | Slade et al. | 335/16 |
| 4,101,862 | 7/1978 | Takagi et al. | 338/23 |
| 4,107,640 | 8/1978 | Asano et al. | 338/23 |
| 4,115,829 | 9/1978 | Howell | 361/42 |
| 4,132,968 | 1/1979 | Lang | 335/16 |
| 4,164,772 | 8/1979 | Hingorani | 361/58 |

(List continued on next page.)

FOREIGN PATENT DOCUMENTS

| | | |
|---|---|---|
| 0 026 456 | 4/1981 | European Pat. Off. . |
| 0 087 884 | 9/1983 | European Pat. Off. . |
| 0 240 447 | 10/1987 | European Pat. Off. . |
| 0 363 746 | 4/1990 | European Pat. Off. . |
| 0 454 422 A2 | 4/1991 | European Pat. Off. . |
| 0 487 920 | 6/1992 | European Pat. Off. . |
| 0 576 836 | 1/1994 | European Pat. Off. . |
| 0 640 995 | 3/1995 | European Pat. Off. . |
| 0 713 227 | 5/1996 | European Pat. Off. . |
| 0 747 910 | 12/1996 | European Pat. Off. . |
| 0 773 562 | 5/1997 | European Pat. Off. . |
| 0 809 267 | 11/1997 | European Pat. Off. . |
| 0 762 439 | 12/1997 | European Pat. Off. . |
| 42 28 297 | 3/1994 | Germany . |
| 43 30 607 | 3/1995 | Germany . |
| 15 70 138 | 6/1980 | United Kingdom . |
| WO 91/12643 | 8/1991 | WIPO . |
| WO 91/19297 | 12/1991 | WIPO . |

(List continued on next page.)

OTHER PUBLICATIONS

Glass Transition Temperature as a Guide to Selection of Polymers Suitable for PTC Materials, J. Meyer, Polymer Engineering And Science, Nov., 1973, vol. 13, No. 6, pp. 462–468.

Stability of Polymer Composites as Positive–Temperature–Coefficient Resistor, J. Meyer, Polymer Engineering And Science, Oct., 1974, vol. 14, No. 10, pp. 706–716.

Primary Examiner—Michael J. Sherry
Attorney, Agent, or Firm—Cantor Colburn LLP; Carl B. Horton

[57] ABSTRACT

A molded case circuit breaker and current suppressing unit protects an electric motor without tripping during motor current reversal. The circuit breaker trip unit provides long time, short time and instantaneous over current protection against abnormal overload and low-current short circuit currents within the protected circuit. The current suppressing unit rapidly suppresses high-current short circuit currents until the circuit breaker responds to isolate the protected equipment.

20 Claims, 2 Drawing Sheets

U.S. PATENT DOCUMENTS

| | | | |
|---|---|---|---|
| 4,165,502 | 8/1979 | Andersen | 335/39 |
| 4,178,618 | 12/1979 | Khalid | 361/58 |
| 4,237,441 | 12/1980 | Konynenburg et al. | 338/22 R |
| 4,292,261 | 9/1981 | Kotani et al. | 264/24 |
| 4,304,987 | 12/1981 | van Konynenburg | 219/553 |
| 4,317,027 | 2/1982 | Middleman et al. | 219/553 |
| 4,329,669 | 5/1982 | Krasser et al. | 335/20 |
| 4,329,726 | 5/1982 | Middleman et al. | 361/58 |
| 4,333,861 | 6/1982 | Aoki et al. | 252/518 |
| 4,347,539 | 8/1982 | Peterson et al. | 361/16 |
| 4,374,049 | 2/1983 | Ellis et al. | 252/519 |
| 4,375,021 | 2/1983 | Pardini et al. | 200/147 B |
| 4,413,301 | 11/1983 | Middleman et al. | 361/106 |
| 4,458,283 | 7/1984 | Iida | 361/76 |
| 4,459,495 | 7/1984 | Gheewala | 307/306 |
| 4,485,283 | 11/1984 | Hurtle | 200/144 R |
| 4,511,772 | 4/1985 | Link et al. | 200/144 R |
| 4,513,268 | 4/1985 | Seymour et al. | 335/35 |
| 4,573,259 | 3/1986 | Seymour et al. | 29/602 R |
| 4,583,146 | 4/1986 | Howell | 361/13 |
| 4,642,136 | 2/1987 | Fukushima et al. | 75/234 |
| 4,645,889 | 2/1987 | Howell | 200/144 AP |
| 4,649,455 | 3/1987 | Scott | 361/93 |
| 4,652,975 | 3/1987 | Scott | 361/404 |
| 4,677,266 | 6/1987 | Belbel et al. | 200/151 |
| 4,685,025 | 8/1987 | Carlomagno | 361/106 |
| 4,746,896 | 5/1988 | Mcquaid et al. | 338/314 |
| 4,749,829 | 6/1988 | Ikeda et al. | 200/144 AP |
| 4,752,660 | 6/1988 | Yokoyama et al. | 200/151 |
| 4,754,247 | 6/1988 | Raymont et al. | 335/202 |
| 4,764,650 | 8/1988 | Bur et al. | 200/153 G |
| 4,780,598 | 10/1988 | Fahey et al. | 219/511 |
| 4,782,583 | 11/1988 | Castonguay et al. | 29/622 |
| 4,789,848 | 12/1988 | Castonguay et al. | 335/167 |
| 4,806,893 | 2/1989 | Castonguay et al. | 335/20 |
| 4,816,958 | 3/1989 | Belbel et al. | 361/93 |
| 4,884,164 | 11/1989 | Dziura et al. | 361/97 |
| 4,890,186 | 12/1989 | Matsubara et al. | 361/103 |
| 4,937,696 | 6/1990 | Yoshino et al. | 361/11 |
| 4,949,060 | 8/1990 | Mikulecky | 337/4 |
| 4,963,849 | 10/1990 | Kowalczyk et al. | 335/201 |
| 4,965,544 | 10/1990 | Kelaita, Jr. et al. | 335/202 |
| 4,967,304 | 10/1990 | Dougherty | 361/31 |
| 4,970,481 | 11/1990 | Arnold et al. | 335/6 |
| 5,057,674 | 10/1991 | Smith-Johannsen | 219/553 |
| 5,068,634 | 11/1991 | Shrier | 338/21 |
| 5,105,178 | 4/1992 | Krumme | 337/140 |
| 5,166,658 | 11/1992 | Fang et al. | 338/23 |
| 5,185,590 | 2/1993 | DiVincenzo | 335/201 |
| 5,210,517 | 5/1993 | Abe | 338/22 R |
| 5,227,946 | 7/1993 | Jacobs et al. | 361/106 |
| 5,247,276 | 9/1993 | Yamazaki | 338/22 R |
| 5,260,848 | 11/1993 | Childers | 361/127 |
| 5,268,661 | 12/1993 | Grunert et al. | 335/16 |
| 5,293,297 | 3/1994 | Desai | 361/106 |
| 5,296,996 | 3/1994 | Hansson et al. | 361/24 |
| 5,303,115 | 4/1994 | Nayar et al. | 361/106 |
| 5,313,180 | 5/1994 | Vial et al. | 335/16 |
| 5,313,184 | 5/1994 | Greuter et al. | 338/21 |
| 5,373,273 | 12/1994 | Guery et al. | 335/201 |
| 5,382,938 | 1/1995 | Hansson et al. | 338/22 R |
| 5,414,403 | 5/1995 | Greuter et al. | 338/22 R |
| 5,416,462 | 5/1995 | Demarmels et al. | 338/22 R |
| 5,424,503 | 6/1995 | Neveu | 218/63 |
| 5,426,406 | 6/1995 | Morris et al. | 335/202 |
| 5,428,195 | 6/1995 | Arnold | 218/1 |
| 5,432,140 | 7/1995 | Sumpter et al. | 502/167 |
| 5,436,274 | 7/1995 | Sumpter et al. | 521/88 |
| 5,451,919 | 9/1995 | Chu et al. | 338/22 R |
| 5,471,035 | 11/1995 | Holmes | 219/505 |
| 5,471,185 | 11/1995 | Shea et al. | 335/51 |
| 5,473,495 | 12/1995 | Bauer | 361/11 |
| 5,495,083 | 2/1996 | Aymami-Pala et al. | 218/1 |
| 5,530,613 | 6/1996 | Bauer et al. | 361/58 |
| 5,539,370 | 7/1996 | Arnold | 337/8 |
| 5,545,679 | 8/1996 | Bollinger, Jr. et al. | 523/512 |
| 5,565,826 | 10/1996 | Karlstrom | 335/16 |
| 5,581,192 | 12/1996 | Shea et al. | 324/722 |
| 5,602,520 | 2/1997 | Baiatu et al. | 338/22 R |
| 5,614,881 | 3/1997 | Duggal et al. | 338/22 R |
| 5,644,283 | 7/1997 | Grosse-Wilde et al. | 338/20 |
| 5,667,711 | 9/1997 | Mody et al. | 219/505 |
| 5,731,561 | 3/1998 | Manthe et al. | 218/35 |

FOREIGN PATENT DOCUMENTS

| | | |
|---|---|---|
| WO 93/07667 | 4/1993 | WIPO . |
| WO 93/21677 | 10/1993 | WIPO . |
| WO 94/10734 | 5/1994 | WIPO . |
| WO 95/03619 | 2/1995 | WIPO . |
| WO 95/19297 | 7/1995 | WIPO . |
| WO 95/34931 | 12/1995 | WIPO . |
| WO 97/49102 | 12/1997 | WIPO . |

CURRENT SUPPRESSING CIRCUIT BREAKER UNIT FOR INDUCTIVE MOTOR PROTECTION

BACKGROUND OF THE INVENTION

When electric motors within the tool-making industry are repeatedly switched between forward and reverse, large inrush currents are temporarily generated for short time intervals. To prevent circuit interruption each time the current is reversed, fuses are generally used in series with overload relays, to protect the associated equipment from abnormal overcurrent conditions. Due to the occurrence of thermal aging when fuses are subjected to repeated high currents, the fuses must be periodically replaced. The higher the inrush current, a phenomena associated with high efficiency motors, the greater the degree of thermal aging so that higher rated fuses are required to resist thermal aging where high efficiency motors are employed. U.S. Pat. No. 5,426,406 entitled "Induction Motor Protective Circuit Breaker Unit" describes the selection of the fuse and circuit breaker for reduced thermal damage to the fuse and effective coordination with the overload relays. Because of their specialized application, the combination of such high rated fuses with overload relays find limited application outside of the tool-making industry.

U.S. Pat. No. 5,539,370 entitled "Inductive Motor Protective Circuit Breaker Unit" describes a polymer short circuit protection element that limits the short circuit current by switching from low resistance to high resistance. The polymer's resistance profile is characterized by its positive temperature coefficient of resistance (PTCR), and exhibits a sharp transition from low to high electrical resistance at a specified temperature. Repeated current reversals from tool-making operations result in cyclic heating of the polymer with little or no cooling periods. to prevent the polymer from inadvertently transitioning from low to high electrical resistance as it heats up, polymer elements having higher steady state current ratings are required. However, the higher rated elements are unable to provide optimum protection under short circuit conditions due to the increased energy required to facilitate switching.

U.S. Pat. No. 4,884,164 entitled "Molded Case Electronic Circuit interrupter" describes an industrial-rated circuit breaker having an electronic trip unit that is adjustable over a wide range of long and short time over-current conditions.

U.S. Pat. No. 4,967,304 entitled "Digital Circuit Interrupter With Electric Motor Trip Parameters" describes a digital circuit interrupter with electric motor trip parameters that includes control algorithms tailored for motor protection applications.

U.S. Pat. No. 5,614,881 filed Aug. 11, 1995, entitled "Current Limiting Device" describes a polymeric current limiting element that is not dependent on a PTCR characteristic.

It would be economically advantageous to provide a circuit breaker employing an electronic trip unit with a current suppressing unit that is not susceptible to cyclic thermal aging, and does not require periodic replacement when used in tool-making operations.

One purpose of the invention is to provide a combined circuit breaker and current suppressing unit that does not interrupt the protected circuit upon motor reversal can be adjusted to provide coordination with the thermal overload relay, and provides optimal protection for short circuit currents.

SUMMARY OF THE INVENTION

The invention comprises an inductive motor protective circuit breaker that includes an electronic trip unit and a current suppressing unit that includes a polymeric current limiter element that is not dependent on positive temperature coefficient of resistance characteristic. The electronic trip unit is adjusted for long time and short time over-current protection. The current suppressing unit is designed to limit the short circuit current until the circuit breaker responds to isolate the protected circuit.

DESCRIPTION OF PREFERRED EMBODIMENT

Figure 1:
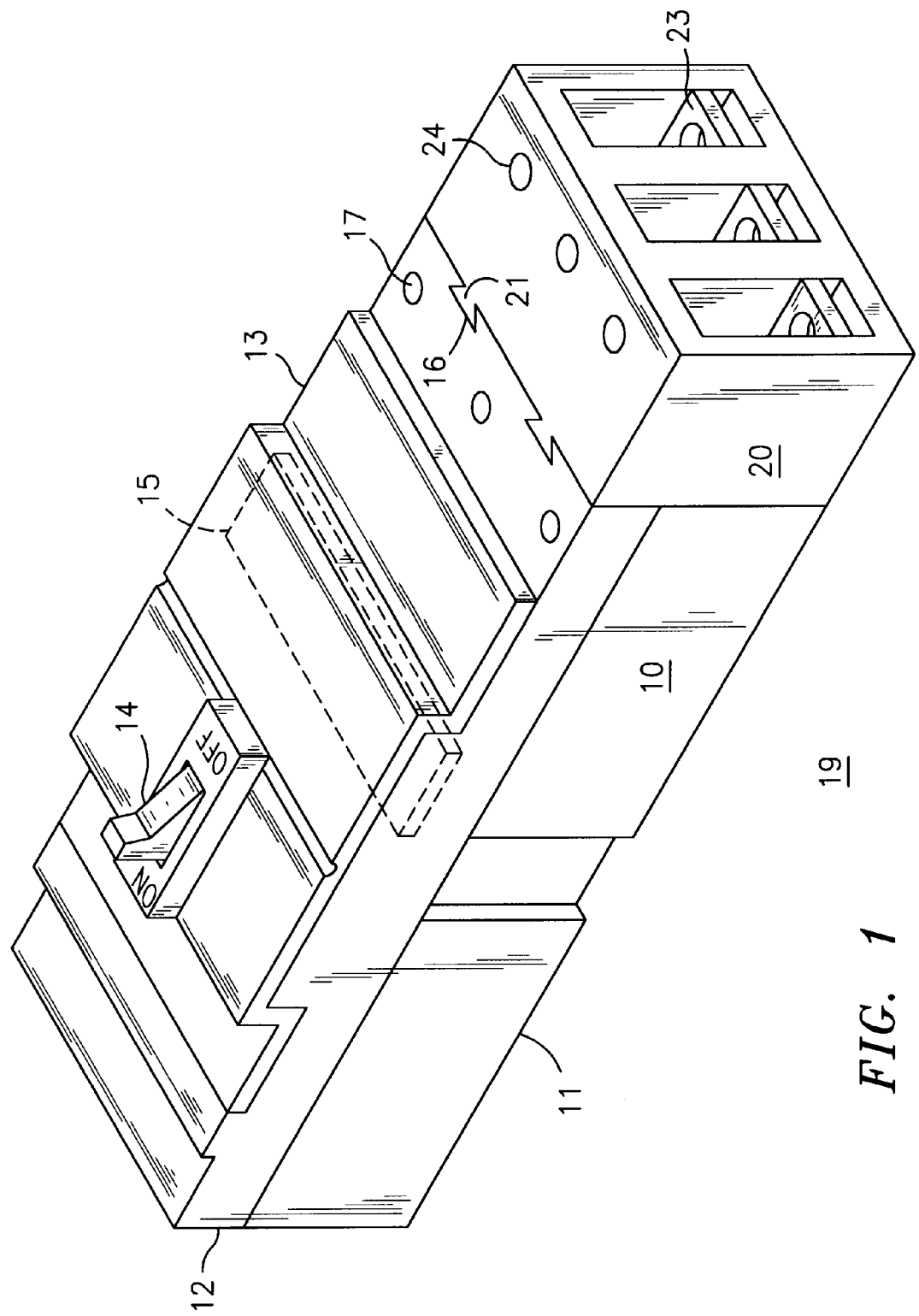
FIG. 1 is a top perspective view of a current suppressing circuit breaker unit in accordance with the invention.
Figure 2:
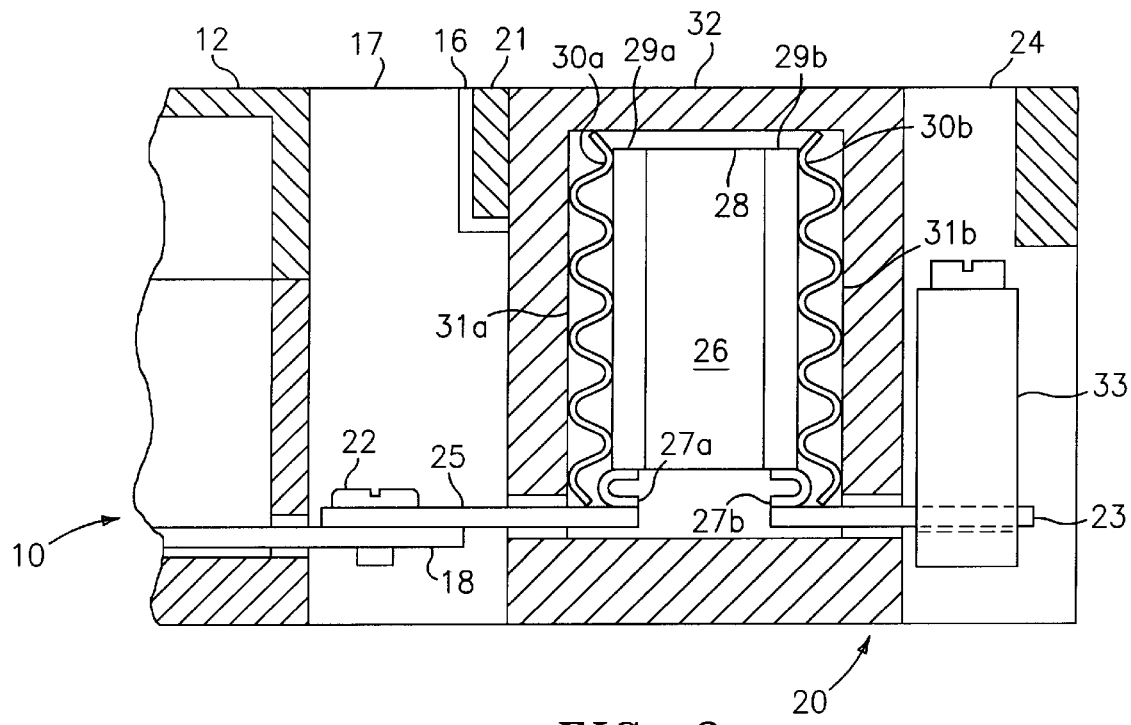
FIG. 2 is a partial section side view of the current suppressing unit within the current suppressing circuit breaker unit of FIG. 1.

FIG. 1 shows a current suppressing circuit breaker unit 19, hereinafter "CSCB" which consists of an electronic circuit breaker 10, described in aforementioned U.S. Pat. No. 4,884,164 and current suppressing unit 20. The electronic circuit breaker includes a circuit breaker case 11 circuit breaker cover 12 and accessory cover 13, as described in U.S. Pat. No. 4,754,247 entitled 'MCCB Accessory Enclosure", which is attached on opposite sides of the operating handle 14. The electronic trip unit 15 contained within the cover is described in U.S. Pat. No. 4,649,455 entitled "rating Plug for MCCB", Dovetail projections 21 integrally-formed within the current suppressing unit enclosure, engage with dovetail slots 16 integrally-formed within the circuit breaker cover. Screws 22, shown in FIG. 2, are accessed through top openings 17 for electrically connecting the current suppressing unit 20 to the electronic circuit breaker 10. Load terminals 23 provide electrical connection with the protected circuit and are accessed by means of terminal access holes 24.

The electrical and mechanical attachment between the current suppressing unit 20 and electronic circuit breaker 10 is depicted in FIG. 2. Dovetail projections 21 integral with the current suppressing unit provide a mechanical interlock with dovetail slots 16 integral with the circuit breaker cover 12. Line straps 25 leading from the current suppressing unit are electrically and mechanically attached to the load straps 18 extending from the electronic circuit breaker by means of screws 22, which are accessed through the top openings 17. The current suppressing unit comprises a housing 32, and a current limiting element 26, which operates in the manner described in aforementioned U.S. Pat. No. 5,614,881, which is incorporated herein by reference. Alternatively, current limiting element 26 may operate in the manner described in U.S. patent application Ser. No. 08/730,321 filed Oct. 11, 1996 and entitled "Current Limiting Device", which is also incorporated herein by reference. The electrode terminals 27a, 27b are electrically connected with electrodes 29a, 29b of the current limiting element 26, and with the line of straps 25 and load terminals 23 respectively. The current limiting element comprises a polymeric conductor 28 electrically connected in series with the abutting electrodes 29a–29b. Springs 30a, 30b are positioned between the electrodes and support surfaces 31a 31b for exerting a compressive force between the electrodes and the polymeric conductor. Lugs 33. accessed through terminal access holes 24 are attached to the load terminals to provide connection with the electrical distribution circuit.

In accordance with one example of the present invention, the polymeric conductor 28 is constructed using an electrically conductive composite material so that there is an inhomogeneous distribution of resistance throughout the current suppressing unit 20. For this current suppressing unit 20 to work properly as a reusable current limiting device, the inhomogeneous resistance distribution should be arranged so that at least one thin layer of the polymeric conductor 28 is positioned perpendicular to the direction of current flow and has a much higher resistance than the average resistance for an average layer of the same size and orientation in the polymeric conductor 28. In addition, the polymeric conductor must be under compressive pressure in a direction perpendicular to the selected thin high resistance layer.

One example of a polymeric conductor 28, in accordance with the present invention, comprises a highly conducting composite material with low pyrolysis temperature binder and conducting filler that is pressure contacted to electrodes 29a, 29b so that there is a significant contact resistance between the material and one or both electrodes. In operation, the current limiting element 26 is placed in series with the electrical circuit to be protected. During normal operation, the resistance of the current limiting element 26 is low (in this example the resistance of the current limiting element would be equal to the resistance of the highly conducting composite material 28 plus the resistance of the electrodes 29a, 29b plus the contact resistance). When a short-circuit occurs, a high current density starts to flow through the element 26. In the initial stages of the short-circuit, the resistive heating of the limiting element is believed to be adiabatic. Thus, it is believed that the selected thin, more resistive layer of the polymeric conductor 28 heats up much faster than the rest of the current limiting element 26. With a properly designed thin layer, it is believed that the thin layer heats up so quickly that thermal expansion of and/or gas evolution from the thin layer cause a separation within the current limiting element at the thin layer.

In a representative current limiting element, it is believed that the vaporization and/or ablation of the composite material 28 causes the electrode 29a, 29b to separate from the material. In this separated state, it is believed that ablation of the composite material 28 occurs and arcing between the separated layers of the current limiting element can occur. However, the overall resistance in the separated state is much higher than in the nonseparated state. This high arc resistance is believed due to the high pressure generated at the interface by the gas evolution from the composite binder combined with the deionizing properties of the gas. In any event, the current limiting element of the present invention is effective in limiting the short-circuited current so that the other components of the circuit are not harmed by the short circuit.

After the short-circuited current is interrupted, it is believed that the current limiting element 26, of the present invention, when properly designed, returns or reforms into its nonseparate state due to compressive pressure which acts to push the separated layers together. It is believed that once the layers of the current limiting element have returned to the nonseparated state or the low resistance state, the current limiting element is fully operational for future current-limiting operations in response to other short-circuit conductors.

Figure 3:
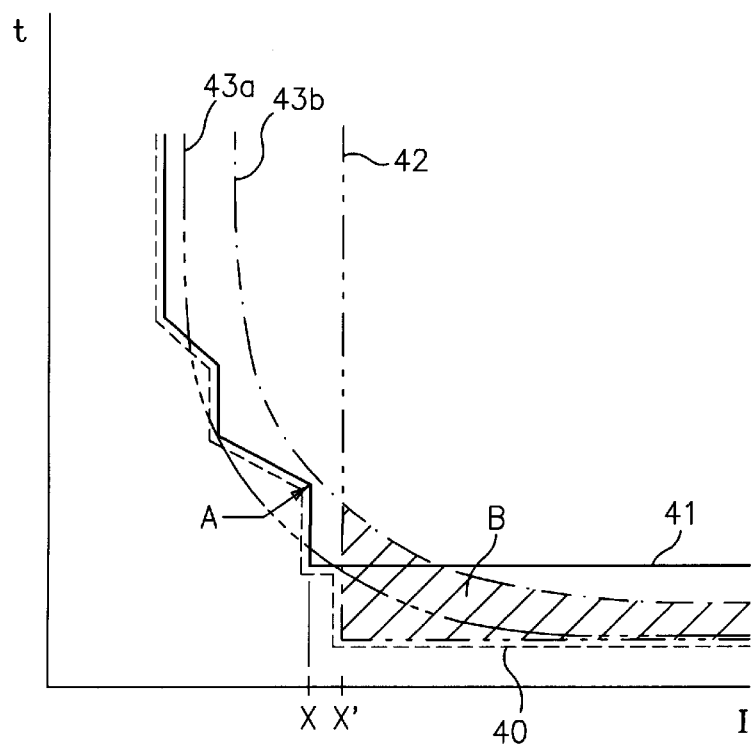
FIG. 3 is a graphic representation of the over-current protection provided by the current suppressing circuit breaker unit of FIG. 1.

The inverse time-current operating characteristic of the CSCB unit 19, according to the invention, has a combined protection profile 40, best understood by referring jointly to FIGS. 1 and 3. The combined protection profile is a composite of the electronic circuit breaker protection profile 41, and the effective current suppressing unit protection profile 42. Absence of a PTCR effect in the current suppressing unit 20 provides optimum coordination with the electronic circuit breaker protection profile in the region of point A, which is typically referred to as the knee of the short time response profile. Optimum coordination requires that the current suppressing unit operate to the right of or above point A, otherwise premature response of the current suppressing unit 20 would interfere with the proper operation of the associated electronic circuit breaker 10. This may be accomplished by either eliminating the PTCR characteristic in the current limiting element, or as presented herein, utilizing a current limiting element that is not dependent on a PTCR characteristic for current suppression. Earlier protection supplied by a fuse or a PTCR polymer current limiter is represented by PTCR protection profiles 43a 43b. PTCR protection profile 43a shows substantially equivalent performance as the effective current suppressing unit protection profile 42 for instantaneous short circuit currents much greater than x. However, in the region of point A, PTCR protection profile 43a does not coordinate with the electronic circuit breaker protection profile 41 as evidenced by the PTCR characteristic being below and left of point A. To obtain the desired coordination about point A, the PTCR protection profile 43b must be accurately predetermined. However, for instantaneous short circuit currents much greater than x, the PTCR protection profile 43b shows substantially lower performance than the effective current suppressing unit protection profile 42. The difference in protection between the PTCR protection profile 43b and the effective current suppressing unit protection profile 42 is shown by shaded region B.

The advantages realized by operation of the CSCB unit is best understood by referring jointly to FIGS. 1–3. With the passage of rated operating current in the protected circuit, the electronic circuit breaker 10 and current suppressing unit 20 within the CSCB are in a quiescent state. Upon the occurrence of long-time or short-time currents, up to and including the value x, the electronic circuit breaker properly responds to interrupt the protected circuit. Upon the occurrence of an instantaneous short circuit current greater than x, the CSCB unit rapidly responds to limit the short circuit let-through energy as described in the aforementioned U.S. patent application Ser. No. 08/514,076. Coordination between the current suppressing unit and the electronic trip unit within the electronic circuit breaker, ensures that the electronic circuit breaker will receive and respond to a trip signal, as described in aforementioned U.S. Pat. No. 4,884, 164 to efficiently isolate the protected circuit.

A current suppressing circuit breaker unit has herein been described having a current suppressing element connected in series with an electronic circuit breaker having an electronic trip unit. The current suppressing circuit breaker unit provides long-time, short-time and short circuit protection to the protected circuit without requiring periodic replacement.

What is claimed is:

1. A current suppressing circuit breaker unit comprising:
   a circuit breaker housing;
   at least one pair of circuit breaker contacts within said circuit breaker housing for interrupting circuit current;
   an operating mechanism within said circuit breaker housing for separating said circuit breaker contacts;
   a trip unit within said circuit breaker housing for articulating said operating mechanism to separate said circuit breaker contacts upon the occurrence of an overcurrent condition in a protected circuit;

a current limiting element electrically connected with said at least one pair of circuit breaker contacts whereby circuit current passes through said current limiting element and becomes limited to a predetermined value upon occurrence of said overcurrent condition, said current limiting element comprising:
- a polymeric conductor; and
- a resistive layer, proximate to and in series with said polymeric conductor in said protected circuit, having a higher resistivity than said polymeric conductor, whereby said overcurrent condition causes resistive heating at said resistive layer resulting in rapid thermal expansion and vaporization of said polymeric conductor at said resistive layer causing at least partial separation at said resistive layer thereby causing rapid suppression of said circuit current;

first and second electrically conducting electrodes, said first electrode being electrically connected between said at least one pair of circuit breaker contacts and said current limiting element, and said second electrode being electrically connected between said current limiting element and the protected circuit; and a spring arranged to force said first electrically conducting electrode towards said second electrically conducting electrode for compressing said current limiting element.

2. The current suppressing circuit breaker unit of claim 1, wherein said circuit breaker housing comprises an electrically-insulative case and cover.

3. The current suppressing circuit breaker unit of claim 1 wherein said trip unit includes an electronic circuit for monitoring and responding to said overcurrent condition.

4. The current suppressing circuit breaker unit of claim 1 wherein said polymeric conductor has a vaporization temperature of less than 1000 degrees C.

5. The current suppressing circuit breaker unit of claim 1 wherein said polymeric conductor is not dependent on a positive temperature coefficient of electrical resistance.

6. The current suppressing circuit breaker unit of claim 1 wherein said polymeric conductor includes an electrically conductive filler.

7. The current suppressing circuit breaker unit of claim 1 wherein said spring comprises a compression spring, said compression spring being arranged intermediate a side of a current limiting enclosure and said first electrode.

8. The current suppressing circuit breaker unit of claim 7 including a line strap extending from said current limiting housing and connecting with a circuit breaker load strap extending from said circuit breaker housing, said line strap being electrically connected to said first electrode.

9. The current suppressing circuit breaker unit of claim 7 including a load strap extending from said current limiting housing for connection with the protected circuit, said load strap being electrically connected to said second electrode.

10. The current suppressing circuit breaker of claim 1 wherein said circuit breaker housing and said current limiting housing are fabricated as one current suppressing circuit breaker housing.

11. The current suppressing circuit breaker unit of claim 1 further including at least one current limiting housing proximate said circuit breaker housing.

12. The current suppressing circuit breaker unit of claim 1 wherein said resistive heating is substantially adiabatic.

13. The current suppressing circuit breaker unit of claim 1 wherein said polymeric conductor comprises an inhomogeneous distribution of resistance throughout.

14. The current suppressing circuit breaker unit of claim 1 wherein said at least partial separation at said resistive layer returns to a substantially nonseparated state.

15. The current suppressing circuit breaker unit of claim 11 wherein said current limiting housing is attached to said circuit breaker housing.

16. The current suppressing circuit breaker unit of claim 15 wherein said circuit breaker housing means comprise dovetail slots.

17. A current suppressing circuit breaker unit comprising:
a circuit breaker housing;
at least one pair of circuit breaker contacts within said circuit breaker housing for interrupting circuit current;
an operating mechanism within said circuit breaker housing for separating said circuit breaker contacts;
a trip unit within said circuit breaker housing for articulating said operating mechanism to separate said circuit breaker contacts upon the occurrence of an overcurrent condition in a protected circuit; and
a current suppressing unit including:
- a current suppressing unit housing mounted proximate to said circuit breaker housing,
- a polymer current limiting element mounted within said current suppressing unit housing, said polymer current limiting element comprising a polymeric electrically-conducting material that is not dependent on positive temperature coefficient of electrical resistance, said current limiting element electrically connected with said circuit breaker contacts whereby circuit current passes through said current limiting element and becomes limited to a predetermined value upon occurrence of said overcurrent condition,
- first and second electrically conducting electrodes, said first electrode being electrically connected between said at least one pair of circuit breaker contacts and said current limiting element, and said second electrode being electrically connected between said current limiting element and the protected circuit;
- a first spring arranged to force said first electrically conducting electrode towards said second electrically conducting electrode for compressing said current limiting element; and
- a line strap extending from said current suppressing unit housing and connecting with a circuit breaker load strap extending from said circuit breaker housing, said line strap being electrically connected to said first electrode.

18. The current suppressing circuit breaker unit of claim 17, wherein said current suppressing unit further includes:
a second spring arranged to force said second electrode towards said first electrode for further compressing said current limiting element; and
a load strap extending from said current suppressing unit housing and connecting with the protected circuit, said load strap being electrically connected to said second electrode.

19. The current suppressing circuit breaker unit of claim 18, wherein said first spring is disposed between said first electrode and said current suppressing unit housing, and said second spring is disposed between said second electrode and said current suppressing unit housing.

20. A current suppressing unit comprising:
a housing;
a polymer current limiting element mounted within said housing, said polymer current limiting element comprising:
first and second electrodes,
an electrically conducting composite material between said electrodes, said composite material comprising (A) a binder with a pyrolysis or vaporization temperature, at which a significant gas evolution occurs, below 800° C., and (B) an electrically conductive filler, interfaces between said electrodes and said composite material;

an inhomogeneous distribution of resistance at said interfaces whereby, during a short circuit, adiabatic resistive heating at said interfaces causes rapid thermal expansion and vaporization of said binder resulting in at least a partial physical separation at said interfaces;

a first spring arranged to force said first electrically conducting electrode towards said second electrically conducting electrode for exerting a compressive pressure on said composite material; and a line strap extending from said current suppressing unit housing and connecting with a circuit breaker load strap extending from said circuit breaker housing, said line strap being electrically connected to said first electrode.

* * * * *